United States Patent
Reed

[15] 3,636,424
[45] Jan. 18, 1972

[54] MOTOR DRIVE SYSTEM WITH ACCELERATION-DECELERATION CONTROL

[72] Inventor: John F. Reed, Middleburg Heights, Ohio
[73] Assignee: The New Britain Machine Company, New Britain, Conn.
[22] Filed: June 23, 1969
[21] Appl. No.: 835,441

[52] U.S. Cl. .............................................. 318/259, 318/341
[51] Int. Cl. ........................................................ H02p 5/16
[58] Field of Search ............... 318/308, 327, 257, 260, 270, 318/271, 328, 341, 345, 284, 263, 276–278, 397, 398, 258, 259

[56] References Cited

UNITED STATES PATENTS

| | | | |
|---|---|---|---|
| 2,778,982 | 1/1957 | Loeffler | 318/257 |
| 3,249,838 | 5/1966 | Mierendorf | 318/257 |
| 3,428,880 | 2/1969 | Muller | 318/257 |
| 3,431,479 | 3/1969 | Joslyn | 318/327 X |
| 3,457,485 | 7/1969 | Leonard | 318/257 |
| 3,293,522 | 12/1966 | Lewis | 318/257 X |
| 3,361,921 | 1/1968 | Montross et al. | 318/341 X |
| 3,439,246 | 4/1969 | Moritz | 318/257 |
| 3,579,065 | 5/1971 | Laukaitis | 318/341 X |

*Primary Examiner*—T. E. Lynch
*Assistant Examiner*—Robert J. Hickey
*Attorney*—David S. Urey, Alan C. Rose and Alfred B. Levine

[57] ABSTRACT

A drive system utilizes silicon-controlled rectifiers and a feedback loop for operating a direct current motor from alternating current input power at a predetermined speed regardless of load conditions. Circuitry is provided for controlling the width of the dead band of the system, and a circuit is provided for controlling acceleration and deceleration of the motor, said circuit having a capacitor and switch means responsive to an error signal to charge and discharge said capacitor.

8 Claims, 6 Drawing Figures

INVENTOR.
JOHN F. REED
BY Watts, Hoffmann,
Fisher & Heinke
ATTORNEYS 3,636,424

MOTOR DRIVE SYSTEM WITH ACCELERATION-DECELERATION CONTROL

FIELD OF THE INVENTION

This invention relates to direct current motor drive systems, operated from alternating current input power, which maintain a predetermined motor speed regardless of the load conditions imposed thereon, and to a drive for a machine tool slidable member, which drive will maintain a predetermined speed of movement of a slide.

SUMMARY OF THE INVENTION

A reversible direct current (DC) motor drives a load. The motor is energized by three-phase alternating current input power through the control system of the invention.

The DC motor also drives a tachometer that provides a voltage signal of one polarity or another depending on the direction of rotation of the motor, which voltage signal accurately reflects the speed of rotation of the motor and hence the speed of drive of the load in one direction. The output from the tachometer is compared with a reference signal that indicates a desired speed of the motor. If the reference signal and the signal from the tachometer are not equal in amplitude, silicon-controlled rectifiers (SCR's) that rectify the input power supplied to the DC motor are caused to become conductive for greater or lesser portions of each half-cycle to increase or decrease the speed of the motor and thus vary the output signal from the tachometer until it and the reference speed signal are equal. Circuitry is provided for controlling the width of the dead band of the system. By "dead band" is meant the range of values over which the difference between the tachometer output signal and the reference speed input signal can vary without affecting the output of the control system. In addition, there is provided a circuit for controlling acceleration and deceleration of the motor.

DESCRIPTION OF A PREFERRED EMBODIMENT

Although the present invention is not limited to any particular application or applications, it is particularly useful when applied to the drive mechanism for a machine tool.

Numerical-controlled machine tools having multiple slides are becoming increasingly popular and economically attractive. In such numerically controlled machine tools, it is a virtual necessity that the drives on the various slides be independently controllable and capable of operating at different speeds under the control of a predetermined program. Also, those drive speeds must be controlled with extreme accuracy to maintain the dimensions of a machined part automatically within the tolerances required in many present-day applications.

The present invention is particularly applicable to such machines as it provides a drive which will actuate a slide as required, including holding a slide stationary accurately maintaining a selected slide speed under all conditions including certain types of machining operations in which the movement of a cutting tool tends to increase the speed of movement of a workpiece past the cutting tool varying the slide speeds without stopping movement of the slide, etc. The first-mentioned feature is particularly important when one considers a climb cutting milling operation, such as is shown diagrammatically in FIG. 1. In this well-known type of milling operation, the cutting tool is cutting downwardly into a workpiece. This obviously tends to increase the speed of movement of the workpiece past the cutting tool. This is undesirable because it tends to degrade the quality of cut taken by the tool in the workpiece.

Figure 1:
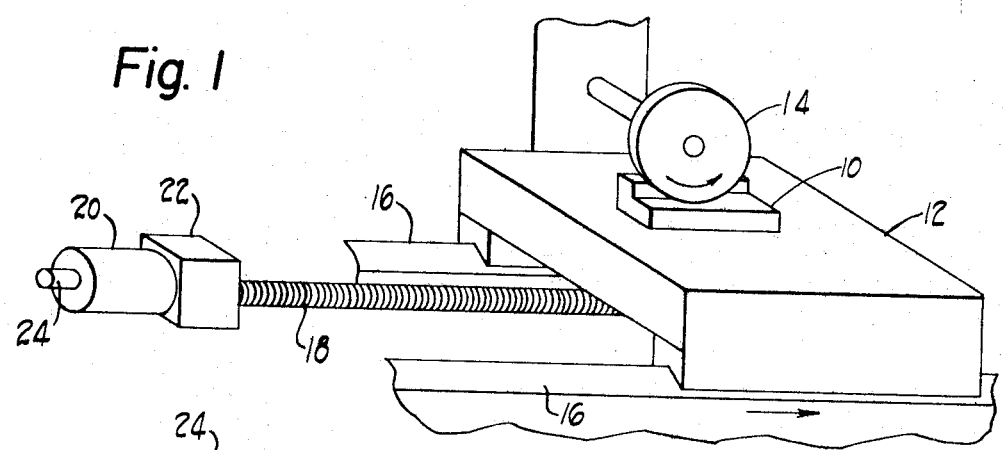
FIG. 1 is a diagrammatic illustration of a machine tool with which the control system of the invention may be used.

A typical machine tool to which the control system of the invention may be applied is shown diagrammatically in FIG. 1. A workpiece 10 is mounted on a table or slide 12 for movement past a cutting tool 14. The slide 12 is mounted on ways 16 and is driven by a screw 18. The screw 18 is rotated by a reversible DC motor 20 through a conventional gearbox 22. An electric tachometer 24 is also driven by the motor 20 and provides a DC output electric signal that is proportional in amplitude to the speed of the motor and of a polarity determined by the direction of rotation of the motor. The output signal from the tachometer 24 is utilized as a feedback signal in the speed control system of the invention. Although only one slide 12 is shown, it is understood that other slides may be provided, each with its own motor and screw to permit the usual movement along various axes.

It is apparent from FIG. 1 that if the slide 12 is being driven by the screw 18 to the right and the cutting tool 14 is rotating in a counterclockwise direction (as shown by the arrows), the action of the cutting tool on the workpiece 10 will tend to increase the speed of movement of the slide 12. This action will tend to increase the speed of the motor 20 and hence increase the amplitude of the output signal from the tachometer 24. The drive system of the invention responds to the increase in the tachometer signal amplitude and operates to maintain the speed of the motor 20 at a substantially constant predetermined value.

Figure 2:
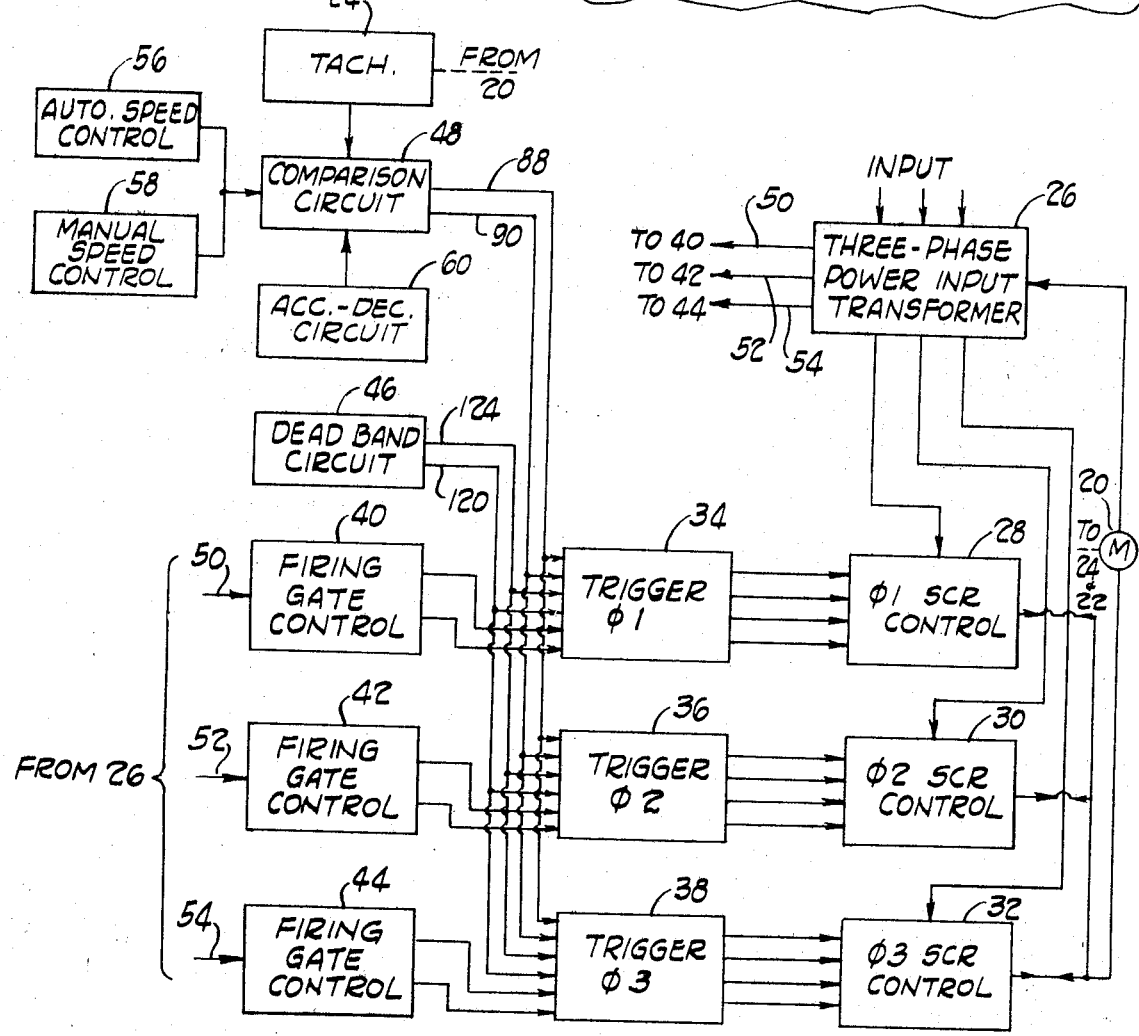
FIG. 2 is a block diagram of a control system embodying the invention.

FIG. 2 is a block diagram of a drive system embodying the invention. It is to be understood that in the following description, the term "signal(s)" means "electric signal(s)." The drive motor 20 is powered from a secondary winding of a three-phase power input transformer 26. Current is supplied to the motor 20 from the transformer 26 through three silicon-controlled rectifier (SCR) control circuits 28, 30, 32, and hence the speed at which the motor 20 will rotate and its direction, are controlled by trigger circuits 34, 36, 38, respectively.

Each of the triggers 34, 36, 38 receives three pairs of input signals. Firing gate controls 40, 42, 44, respectively, provide one pair of the input signals to the triggers 34, 36, 38. A second pair of input signals is provided to all of the triggers from a dead band circuit 46, and a third pair of input signals is provided to all of the triggers from a comparison circuit 48.

Each firing gate control 40, 42, 44 determines the exact period and duration of time during which a particular SCR in the SCR control circuits 28, 30, 32 may have a trigger pulse applied to it from the triggers 34, 36, 38. The firing gate controls 40, 42, 44 provide enabling signals that permit the triggers 34, 36, 38 to apply trigger pulses to the various SCR's in the SCR controls only during that period of time when the anodes of those particular SCR's to be triggered are positive. To accomplish this purpose, power is supplied to the firing gate controls 40, 42, 44 on leads 50, 52, 54, respectively, from the secondary winding of the three-phase power input transformer 26.

The dead band circuit 46 provides a pair of signals to the triggers 34, 36, 38 that control the width of the dead band of the system. That is, the signals from the dead band circuit 46 control the range of values over which input signals to the triggers 34, 36, 38 from the comparison circuit 48 may vary without actuating the triggers.

The comparison circuit 48 receives two input signals and provides two output signals that vary from a predetermined level in opposite directions and by amounts that are proportional to the difference in amplitude between the two input signals to the circuit. One of the input signals is provided from the tachometer 24 which, as previously pointed out, is driven by the motor 20 and provides an output signal that is proportional to the motor speed and of a polarity determined by the direction of rotation of the motor. The other input signal to the comparison circuit comes either from an automatic speed control 56 or from a manual speed control 58. The signals from the speed controls 56, 58 serve as reference signals to control the speed and direction of rotation of the motor 20.

The difference signal in the comparison circuit 48 between the signals from either the automatic speed control 56 or the manual speed control 58 and the tachometer 24 is modified by a timed acceleration-deceleration circuit 60. The circuit 60 serves to prevent any fast change in speed of the drive motor 20. In other words, the circuit 60 acts to adjust the electrical time constant of the control circuit to match the mechanical time constant of the drive system. In addition, it prevents following circuitry from going into saturation, and allows the motor to change to a different desired speed under control of the speed control system.

Figure 3:
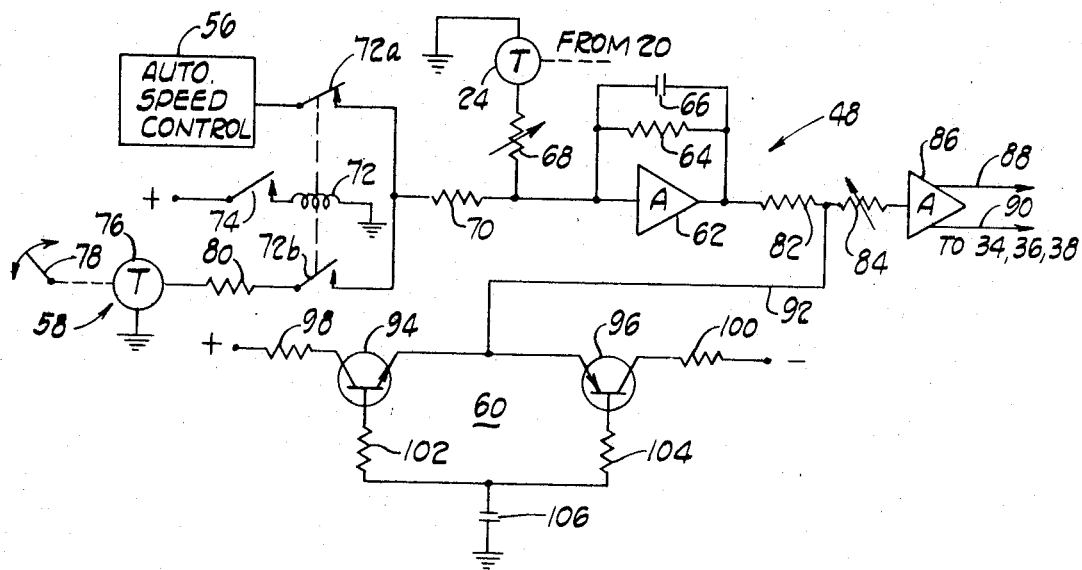
FIG. 3 is a circuit diagram of a comparison circuit and an acceleration-deceleration circuit shown in block form in FIG. 2.

FIG. 3 is a schematic diagram (partially in block form) of the comparison circuit 48 and its input circuitry, and of the timed acceleration-deceleration circuit 60. The comparison circuit 48 includes an operational amplifier 62, which is provided with the usual parallel combination of a feedback resistor 64 and a capacitor 66. Input to the amplifier 62 is from the output of the tachometer 24 through a variable resistor 68, and from either the automatic speed control 56 or the manual speed control 58 through a resistor 70. The polarities of the signals provided from the tachometer 24 and from either of the speed control circuits 56, 58 are opposite. They are added algebraically and the resultant representing the difference in amplitude between the two signals is amplified by the amplifier 62. The variable resistor 68 provides a calibration for initially balancing the tachometer output signal and the reference signal when the motor is rotating at the correct speed.

The automatic speed control 56 may take any one of a number of forms. For example, it may be the output circuitry of a computer that provides a signal that is proportional to a desired motor drive speed, as might be the case in a numerical control application. The manual speed control 58 might take the form of a rotary switch, each position of which provides a different fixed reference voltage to the comparison circuit to indicate different desired speeds.

The automatic speed control 56 is connected to the resistor 70 through a normally closed section 72a of a relay 72. The relay 70 is connected to be energized from a source of positive voltage (not shown) through a normally open, manually actuatable switch 74. When the switch 74 is open as shown, the signal from the automatic speed control 56 is connected into the summing amplifier 62.

The relay 72 has a second, normally open section 72b, which serves to connect the manual speed control 58 to the input of the amplifier 62. When the manually actuable switch 74 is closed, the contact 72a opens and the contact 72b closes. Thus, the reference signal source is transferred from the automatic speed control 56 to the manual speed control 58.

The output of the operational amplifier 62 is connected through a fixed resistor 82 and a series-connected variable resistor 84 to an input of a complementary output amplifier 86. The variable resistor 84 serves as a system gain control. The amplifier 86 provides linearly complementary output signals that vary about a predetermined level such, for example, as +10 volts. That is, as one output signal goes more positive, the other output signal goes more negative by an equal amount and vice versa. These complementary signals are provided on output leads 88, 90.

The timed acceleration-deceleration circuit 60 is connected by means of a lead 92 to a juncture between the resistors 82, 84. The circuit 60 comprises an NPN-transistor 94 and a PNP-transistor 96, which serve as switches. The emitters of the transistors 94, 96 are connected together and to the lead 92. The collector of the transistor 94 is connected through a resistor 98 to a positive potential source (not shown), and the collector of the transistor 96 is connected through a resistor 100 to a negative potential source (not shown). The bases of the transistors 94, 96 are respectively connected through resistors 102, 104 to one side of a capacitor 106, the other side of which is grounded.

In operation, if the voltage applied to the emitter of the transistor 96 through the lead 92 exceeds the base-to-emitter standoff voltage of that transistor, then the transistor 96 will start to conduct. This causes the capacitor 106 to charge through the emitter-base circuit of the transistor 96 until its charge approximately equals the emitter voltage of the conducting transistor 96. The charging rate of the capacitor 106 determines the rate at which current is supplied to the input of the complementary output amplifier 86. When the input voltage through the lead 92 changes so that it exceeds the base-to-emitter standoff voltage of the transistor 94, the same action occurs, but conduction is through the transistor 94 to discharge the capacitor 106 until its charge approximates the emitter voltage of the transistor 94. In other words, if the voltage on the emitters of the transistors 94, 96 goes suddenly in a positive direction, the transistor 96 will conduct to charge the capacitor 106 positively. Conversely, if the voltage on the emitters of the transistors goes suddenly in a negative direction, the transistor 94 will conduct to discharge the capacitor 106. Thus, a timed acceleration or deceleration function is obtained by charging and discharging the capacitor 106.

The particular advantage of using the transistors 94, 96 in the configuration shown is that the charging and discharging rates of common capacitor 106 taken advantage of the current gain (beta) of the transistors and allows a much smaller capacitor to be used than if a passive resistance-capacitance network were used.

Figure 4:
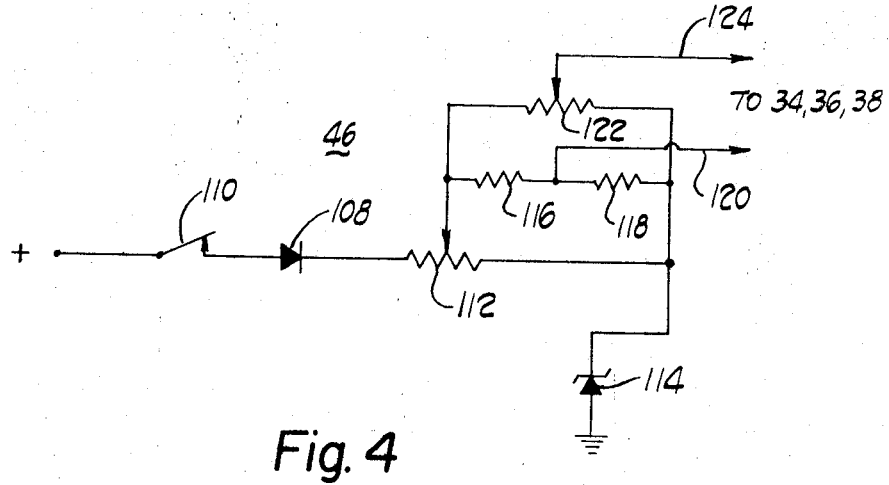
FIG. 4 is a circuit diagram of a circuit for controlling null balance and dead band shown in block form in FIG. 2 as a dead band circuit.

The dead band circuit 46 shown in FIG. 4 performs two functions. First, it serves to set the dead band of the control system, within which it will not respond to variations in output signals from the complementary amplifier 86. Second, it provides a signal to the triggers 34, 36, 38 to adjust each of the triggers so that each trigger responds in a similar manner to both positive and negative half-cycles of the input voltage. The circuit 46 comprises a diode 108, whose anode is connected through a switch 110 to a positive potential source (not shown). The cathode of the diode 108 is connected through a potentiometer 112 to the cathode of a Zener diode 114; the anode of the Zener diode 114 is grounded. Two fixed resistors 116, 118 are connected in series between a movable arm of the potentiometer 112 and the cathode of the Zener diode 114. An output signal is obtained on a lead 120 connected to a juncture between fixed resistors 116, 118. A potentiometer 122 is similarly connected between the movable arm of the potentiometer 112 and the cathode of the Zener diode 114. An output signal is also obtained on a lead 124 connected to a movable arm of the potentiometer 122. The leads 120, 124 serve as input leads to the triggers 34, 36, 38.

In operation, the switch 110 serves as an "on-off" switch for the control system. If the switch 110 is open, no output signals will be provided from the triggers 34, 36, 38 to the SCR controls 28, 30, 32 and the motor 20 will not be energized. When the switch 110 is closed as shown, certain positive voltages will be applied through the leads 120, 124 to the triggers 34, 36, 38. The voltages so applied are basically controlled by the setting of the movable arm of the potentiometer 112. As will later become apparent in connection with the description of the triggers, the setting of the movable arm of the potentiometer 112 determines the dead band of the control system. The purpose of the potentiometer 122 is to permit the signals on the leads 120, 124 to be equal in amplitude. Thus the potentiometer 122 serves as a balance adjustment for the portions of each trigger circuit that respond to positive-going and negative-going half-cycles of input voltage.

Figure 5:
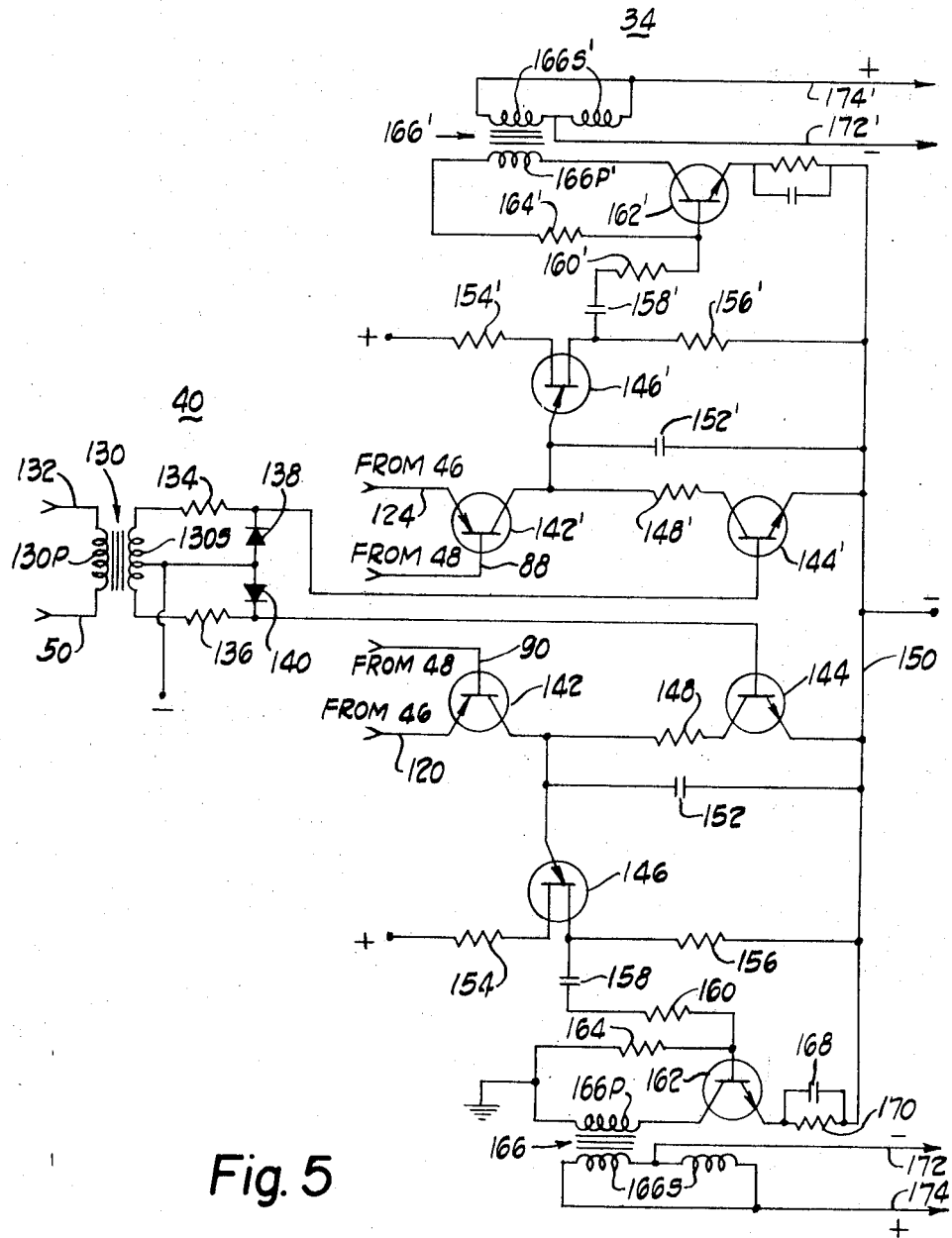
FIG. 5 is a circuit diagram of a firing-gate generator and trigger circuit shown in block form in FIG. 2.

FIG. 5 illustrates the firing gate control 40 and the trigger 34 in schematic form. Inasmuch as the firing-gate controls 40, 42, 44 are identical and the triggers 34, 36, 38 are identical, only the firing-gate control 40 and the trigger 34 will be described in detail.

Figure 6:
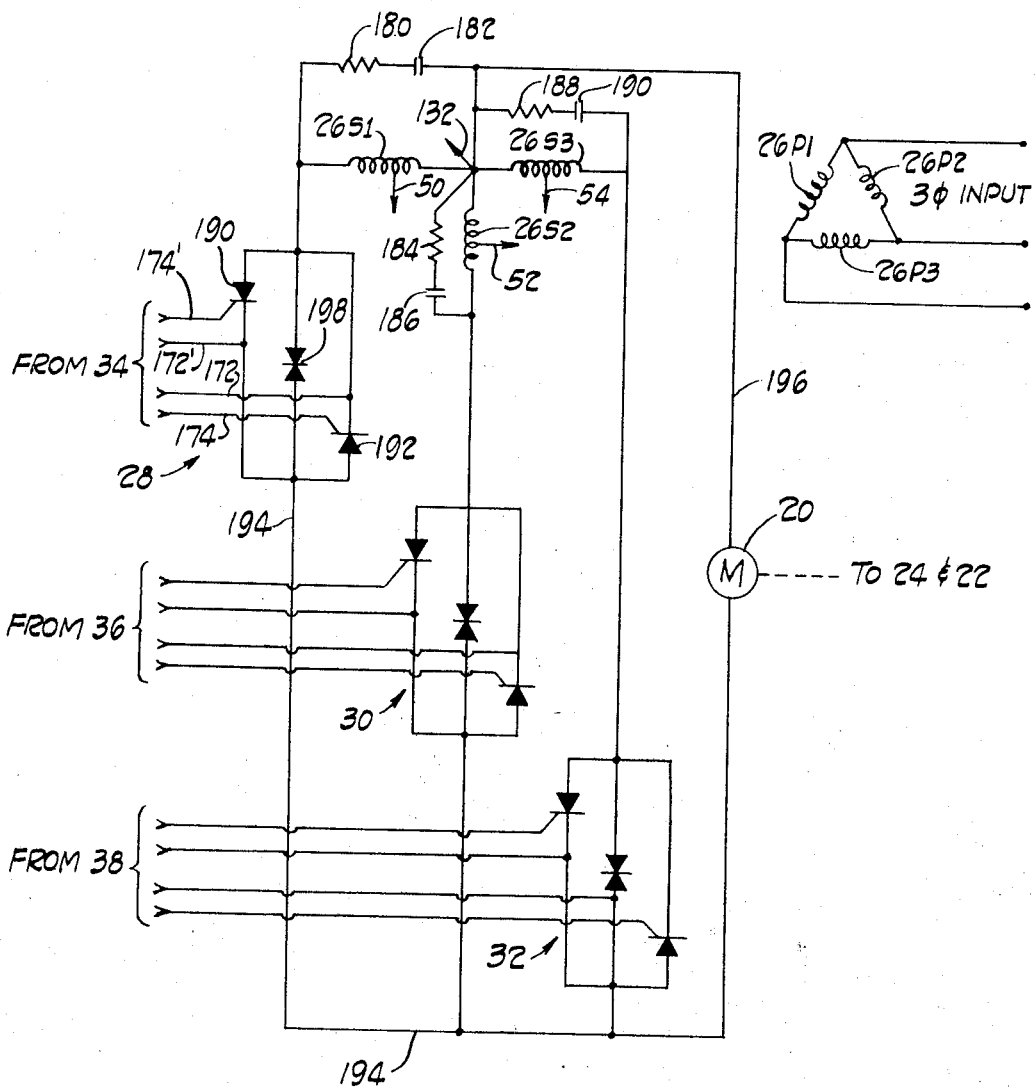
FIG. 6 is a circuit diagram of controlled-rectifier circuits shown in block form in FIG. 2.

The firing-gate control 40 comprises a transformer 130 having a primary winding 130P and a secondary winding 130S. One end of the primary winding 130P is connected to the lead 50 from the three-phase power input transformer 26 (FIG. 1), and the other end of the primary winding is connected to a lead 132. The secondary of the power input transformer 26 is connected in the form of a Y-configuration (as best seen in FIG. 6), and the lead 132 is connected to the center of the Y. The lead 132 is common to all three of the firing-gate controls 40, 42, 44.

A center tap on the secondary winding 130S of the transformer is connected to a negative potential source (not shown). Opposite ends of the secondary winding 130S are respectively connected through resistors 134, 136 to the cathodes of diodes 138, 140. The anodes of the diodes 138, 140 are connected together and to the center tap on the secondary winding 130S of the transformer 130. The secondary winding 130S of the transformer 130 provides positive voltages to the bases of two transistors in the trigger circuit 34. The purpose of the diodes 138, 140 is to prevent breakdown of these transistors when the voltages across the secondary winding 130S reverse in polarity.

The trigger 34 is divided into two sections shown as upper and lower mirror images in FIG. 5. One section responds to one half-cycle of each alternating current input cycle and the other section responds to the other half cycle. Only one section will be described in detail. The same reference numerals are applied to like components of both sections but with those of the upper section being shown followed by a prime suffix.

The lower section of the trigger 34 comprises a PNP-charge-control transistor 142, an NPN-gate transistor 144, and a unijunction transistor 146. The upper section comprises similar transistors 142', 144' and 146'.

The input connections to the transistors 142, 142' are different, but otherwise the circuitry of the two sections is identical. The base of the transistor 142 is connected to the lead 90 from the complementary amplifier 86 in the comparison circuit 48, while the base of the transistor 142' is connected to the lead 88 from the amplifier 86. The emitter of the transistor 142 is connected to the lead 120 from the dead band circuit 46, while the emitter of the transistor 142' is connected to the lead 124 from the dead band circuit. With those noted differences, the upper and lower sections of the trigger are identical and only the lower section shown in FIG. 5 will be described.

The collector of the transistor 142 is connected through a resistor 148 to the collector of the transistor 144. The emitter of the transistor 144 is connected to a negative potential source (not shown) by means of a lead 150. A charge control capacitor 152 is connected between the collector of the transistor 142 and the negative lead 150. When the charge control transistor 142 is conductive, the charge control capacitor 152 will charge; when the gate transistor 144 is conductive, the charge control capacitor is shorted by the transistor 144.

The collector of the charge control transistor 142 and one side of the charge control capacitor 152 are connected to the emitter of the unijunction transistor 146. One base of the transistor 146 is connected through a resistor 154 to a positive potential source (not shown) and the other base of the transistor 146 is connected through a resistor 156 to the negative lead 150. The base of the transistor 146 that is connected to the resistor 156 is also connected through a capacitor 158 and a series-connected resistor 160 to the base of an NPN-buffer-amplifier transistor 162. The base of the transistor 162 is also grounded through a resistor 164. The collector of the transistor 162 is connected to ground through a primary winding 166P of a pulse transformer 166. The emitter of the transistor 162 is connected to the negative lead 150 through a parallel combination of a capacitor 168 and a resistor 170.

The pulse transformer 166 has a pair of secondary windings 166S, which are connected in parallel. The primary and secondary windings of the transformer 166 are so arranged that negative and positive output signals are provided on leads 172, 174, respectively, from the secondary winding 166S when the transistor 162 conducts.

As an aid to understanding the operation of the circuitry thus far described, assume first that the drive motor 20 is in a desired direction but is not running at the desired speed. Therefore, there will be a signal of a given polarity and amplitude at the input to the operational amplifier 62. This will cause an unbalance between the output signals of the complementary amplifier 86. For example, the output signal on the lead 88 might be at +12 volts, while the signal on the output lead 90 might be at +8 volts. Further assume that the dead band circuit 46 has been so adjusted that the output signals on the leads 120, 124 are both approximately +10 volts. This means that the base of the transistor 142' in the trigger circuit will be more positive than the emitter of that transistor, and so the transistor 142' will be nonconductive and the charge control capacitor 152' will not charge. On the other hand, the emitter of the transistor 142 in the other section of the trigger circuit will be positive with respect to the base of the transistor, which will permit the charge control capacitor 152 to charge at a predetermined rate. When the capacitor 152 has charged to the emitted peak voltage point of the unijunction transistor 146, the transistor 146 conducts and the capacitor 152 discharges through the transistor 146 and the resistor 156. This provides a positive pulse through the capacitor 158 and the resistor 160 to the base of the buffer amplifier transistor 162, which causes that transistor to conduct. The resulting output pulse from the transistor 162 is transmitted through the pulse transformer 166 to the output leads 172, 174.

If now the motor is caused to reverse direction but is not running at a desired speed, the input signal to the operational amplifier 62 in the comparison circuit 48 will be of opposite polarity to that previously described. The signal on the output lead 88 will be less positive than 10 volts and the signal on the output lead 90 will be more positive than 10 volts. This will cause the charge control transistor 142' in the trigger 34 to become conductive and the transistor 142 to become nonconductive. Thus, discharge of the charge control capacitor 152' through the unijunction transistor 146' will cause output pulses to appear on the leads 172', 174'. As will be later explained, output pulses on the leads 172, 174 cause the motor 20 to rotate in one direction, while output pulses on the leads 172', 174' cause the motor to rotate in a reverse direction.

The purpose of the gate transistors 144, 144' is to permit their respective charge control capacitors 152, 152' to discharge alternately each half-cycle. That is, when the upper end of the transformer secondary winding 130S goes positive each alternate half-cycle, the transistor 144' becomes conductive and effectively short circuits the charge control capacitor 152' to discharge it. A similar action occurs during alternate half-cycles wherein the gate capacitor 144 becomes conductive to discharge the charge control capacitor 152. Thus, neither of the charge control capacitors 150, 152' can charge for more than one half-cycle of the alternating current input voltage to the SCR control associated with that particular trigger.

As previously pointed out, the signals from the comparison circuit on the leads 88, 90 vary in amplitude about a fixed positive voltage level in accordance with the amplitude and polarity of the error signal at the input of the complementary amplifier 86. If the error signal is of one polarity, the signal on the lead 88 will be more positive than that on the lead 90. If the error signal is of the other polarity, the signal on the lead 90 will be more positive than that on the lead 88.

Which of the signals is most negative controls which of the charge control transistors 142, 142' becomes conductive. The degree to which either transistor 142, 142' conducts depends on the amount by which its emitter potential (on leads 120 or 124 from the dead band circuit 46) exceeds its base potential (on leads 88 or 90 from the complementary amplifier 86). The degrees of conduction of the transistors 142, 142' respectively control the charging time constants of the charge control capacitors 152, 152'. This, of course, determines the time in a half-cycle when the charge across one of the capacitors 152, 152' will equal the emitter peak voltage level of its associated unijunction transistor 146, 146' and cause an output pulse to appear on the leads 172, 174 or 172', 174'.

It is pointed out that the control system does not permit the motor 20 to run at an absolutely constant speed. There is always some slight "jockeying" between the actual speed of the motor and the desired speed of the motor. This is caused by the fact that there must be some difference in the output signals on the leads 88, 90 from the complementary amplifier 86 in the comparison circuit 48 to cause any rotation of the motor. If both signals from the comparison circuit 48 are equal to both signals from the dead band circuit 46, neither of the charge control transistors 142, 142' will become conductive and there will be no power supplied to the motor. Nevertheless, it has been found in practice that a desired speed of rotation of the motor 20 can be controlled under various load conditions to within 1 percent of the desired value.

FIG. 6 illustrates the three-phase power input transformer 26 and the SCR controls 28, 30, 32. As shown, the power input transformer has three primary windings 26P1–26P3 connected in a delta configuration. It also has three secondary windings 26S1–S3 connected in a Y-configuration. A common point of the secondary windings is connected to the lead 132 previously mentioned in connection with FIG. 5. Each of the secondary windings 26S1–S3 is tapped to provide the signals on the conductors 50, 52, 54 to the firing gate controls 40, 42, 44, respectively. Each of the transformer secondary windings is also provided with a series combination of a capacitor and a resistor for transient suppression. The winding 26S1 has connected thereacross a resistor 180 and a capacitor 182; similarly connected across the winding 26S2 are a resistor 184 and a capacitor 186; and a resistor 188 and a capacitor 190 are connected in the same fashion across the winding 26S3.

The SCR controls 28, 30, 32 are respectively connected to the outer ends of the secondary transformer windings 26S1, 26S2, 26S3. Inasmuch as the SCR controls 28, 30, 32 are identical to each other in construction, and differ only in the source from which they obtain their input signals, only the SCR control 28 will be described in detail.

The control 28 comprises a pair of SCR's 190, 192. The anode of the SCR 190 and the cathode of the SCR 192 are connected to the outer end of the secondary winding 26S1. The cathode of the SCR 190 and the anode of the SCR 192 are connected through a lead 194 to one side of the DC reversible motor 20. The other side of the motor 20 is connected to the center point of the Y of the transformer secondary through a lead 196. A thyrector 198 is connected in parallel with the SCR's 190, 192. The thyrector 198 comprises back-to-back, selenium rectifiers which serve to clip any transients that might cause the SCR's 190, 192 to fire falsely. The SCR 190 has a gate electrode which is connected to the lead 174' from the trigger 34. The cathode of the SCR 190 is connected to the lead 172' from the same trigger. The SCR 192 has a gate electrode that is connected to the lead 174 from the trigger 34, and the cathode of the SCR 192 is connected to the lead 172 from that same trigger. The SCR controls 30, 32 are constructed similarly to the control 28, but receive their control signals from the triggers 36 and 38, respectively, rather than from the trigger 34.

In operation, during one half-cycle of each full cycle of alternating current input, the anode of the SCR 190 will be positive. If, sometime during that position half-cycle, a positive pulse trigger signal is received on the lead 174', the SCR 190 will become conductive. Thus, current will flow in a counter-clockwise direction around the circuit to cause the motor 20 to rotate in one direction and at a speed determined by the point in time during the positive half-cycle of input voltage that a trigger pulse was received on the lead 174'. The SCR 190 will continue to conduct during the remainder of that positive half-cycle after it has received the trigger and will cease conduction only when its anode become negative with respect to its cathode. As previously pointed out in connection with the description of FIG. 5, trigger signals cannot be provided simultaneously on both the pairs of leads 172, 174 and leads 174', 174'. Thus if signals are received on the leads 172', 174', the SCR 192 will not become conductive and current will flow in only one direction through the motor 20.

On the other hand, if it is desirable to have the motor rotate in the opposite direction, the control system will provide trigger signals on the leads 172, 174 and not on the leads 172', 174'. In this case, current will circulate in a clockwise direction through the circuit to cause the motor to rotate in an opposite direction from the first example given.

The same operational example applies to the SCR controls 30, 32 which operate on the other phases 26S2, 26S3 of the transformer secondary. As was previously pointed out, a positive signal can appear on the conductor 174' only when the anode of the SCR 190 is positive. Similarly, a positive signal can appear on the lead 174 only when the anode of the SCR 192 is positive. Thus, positive turn on the desired SCR is assured.

It is pointed out that a drive circuit would be provided for each slide motor drive of a multiple-slide machine tool. However, each circuit need not be provided with its own power input transformer. For example, if two 5-horsepower DC motors are used, a single 10-horsepower power transformer may be employed with two drive circuits connected in parallel to the transformer.

It is now apparent that the motor drive circuit of the invention provides a system that permits the motor to be quickly reversed in its direction of rotation or its speed changed without stopping the motor. The system provides self-braking of the motor if the load causes the motor speed to increase. In addition, the system involves no relatively slow-acting control relays, and is inexpensive to construct. Because of its solid-state construction, the system to construct. Because of its solid-state construction, the system is made virtually trouble-free.

I claim:

1. In a speed control system for DC motors having rectifiers for regulating the power applied to the motor according to the difference signal between reference and motor feedback signals, modifying means for limiting the accelerations and deceleration of said motor, and adjustable dead band control means for rendering the system insensitive to difference signals less than a preset amplitude, said modifying means comprises a capacitor means and switch means responsive to said difference signal for charging and discharging said capacitor.

2. The system of claim 1, wherein said switch means comprise transistor means.

3. The system of claim 2, wherein said transistor means include a PNP-transistor for charging said capacitor means and an NPN-transistor for discharging said capacitor means.

4. The system of claim 3, wherein said difference signal provides emitter voltage to said transistors, and said capacitor means comprises a capacitor that is common to base-emitter circuits of both said transistors.

5. In a speed control system for DC motors having electronically controlled rectifiers for automatically regulating the power applied to the motor according to the difference signal between reference and motor feedback signals, the improvement comprising electronic modifying means for limiting the acceleration and deceleration of said motor, said modifying means including an electronic time delay circuit and switch means for limiting any change in said difference signal to less than a predetermined rate, said modifying means comprises capacitor means and said switch means responsive to said difference signal for charging and discharging said capacitor.

6. The system of claim 5, wherein said switch means comprise transistor means.

7. The system of claim 6, wherein said transistor means include a PNP-transistor for charging said capacitor means and an NPN-transistor for discharging said capacitor means.

8. The system of claim 7, wherein said difference signal provides emitter voltage to said transistors, and said capacitor means comprises a capacitor that is common to base-emitter circuits of both a said transistors.

* * * * *